(12) United States Patent
Di Gaetano (10) Patent No.: US 9,182,150 B2
(45) Date of Patent: Nov. 10, 2015

(54) CABLE SUPPORT STRUCTURE

(76) Inventor: Alberto Di Gaetano, San Bonifacio (IT)

( * ) Notice: Subject to any disclaimer, the term of this patent is extended or adjusted under 35 U.S.C. 154(b) by 52 days.

(21) Appl. No.: 13/811,425

(22) PCT Filed: Jul. 22, 2010

(86) PCT No.: PCT/IT2010/000327
§ 371 (c)(1),
(2), (4) Date: Jan. 22, 2013

(87) PCT Pub. No.: WO2012/011135
PCT Pub. Date: Jan. 26, 2012

(65) Prior Publication Data
US 2013/0119206 A1    May 16, 2013

(51) Int. Cl.
*F24J 2/52*    (2006.01)
*F24J 2/46*    (2006.01)

(52) U.S. Cl.
CPC *F24J 2/52* (2013.01); *F24J 2/5241* (2013.01); *F24J 2/4638* (2013.01); *F24J 2002/5284* (2013.01); *F24J 2002/5292* (2013.01); *Y02B 10/20* (2013.01); *Y02E 10/47* (2013.01); *Y10T 24/39* (2015.01)

(58) Field of Classification Search
CPC .......... F24J 2/5241; F24J 2/52; F24J 2/4638; F24J 2002/5284; F24J 2002/5292; Y02B 10/20; Y02B 10/47; Y10T 24/39
USPC ........... 248/49; 126/621, 623; 52/173.3, 245, 52/244
See application file for complete search history.

(56) References Cited

U.S. PATENT DOCUMENTS

| | | | | |
|---|---|---|---|---|
| 4,233,963 A * | 11/1980 | Werner | ......................... | 126/628 |
| 5,769,068 A * | 6/1998 | Takahashi | ..................... | 126/569 |
| 6,570,084 B2 * | 5/2003 | Dinwoodie | ................... | 136/251 |
| 8,256,169 B2 * | 9/2012 | Cusson et al. | ............... | 52/173.3 |
| 8,536,442 B2 * | 9/2013 | Stancel | ......................... | 136/251 |
| 2010/0077592 A1 | 4/2010 | Casano | | |
| 2010/0108113 A1 | 5/2010 | Taggart et al. | | |
| 2010/0218441 A1 * | 9/2010 | Stancel et al. | ............... | 52/173.3 |
| 2010/0307991 A1 * | 12/2010 | Belikoff et al. | ............ | 211/41.17 |
| 2011/0197944 A1 * | 8/2011 | Hund et al. | .................... | 136/244 |
| 2013/0193301 A1 * | 8/2013 | Jackson et al. | ................ | 248/676 |

FOREIGN PATENT DOCUMENTS

| | | |
|---|---|---|
| DE | 20 2008 014676 U1 | 3/2009 |
| JP | 58 173340 A | 10/1983 |
| JP | 59 084045 A | 5/1984 |
| JP | 7 045851 A | 2/1995 |

* cited by examiner

*Primary Examiner* — Anita M King
(74) *Attorney, Agent, or Firm* — Foley & Lardner LLP; James C. De Vellis (57) ABSTRACT

A cable support structure, used in a solar application or other applications, comprising a cable structure which comprises latitudinal cables extending between two sides of an enclosure of a roof, panels or solar modules being arranged in a row on the latitudinal cables forming an array supported by the cable structure, the cable structure in turn being supported by the sides of the enclosure in such a way that weight of the array and force loads on the array are completely or partially distributed on the sides of the enclosure.

12 Claims, 9 Drawing Sheets

CABLE SUPPORT STRUCTURE

CROSS-REFERENCE TO RELATED APPLICATIONS

This application is a 371 national stage application of PCT/IT2010/000327 filed Jul. 22, 2010 the entirety of which is incorporated by reference herein.

The present invention relates to a support structure for panels, and particularly to a support structure for solar modules. More particularly the present invention is improved with a hook for fastening panels or solar modules to cables or bars or chains or other supports like cables or bars or chains.

BACKGROUND OF THE INVENTION

One installation of solar module is to install the solar module onto the surface provided by a rack system on a roof or ground. The process of the traditional installation of solar module comprises:
1. Screwing anchorages on the roof (or if ground mounted, stick pillars in the ground or concrete);
2. Sealing the holes on the roof at the anchorage points;
3. Assembling a rack system made by rigid and heavy parts;
4. Securing the rack system to the anchorage points on the roof or on the ground;
5. Screwing the solar modules on the rack;
6. Electrically connecting solar modules with electric cables.

A traditional variant of screwing rack system into the roof is to make the whole system heavier with ballasts.

However, roofs are often designed to support a limited static load and this is not enough to support the gravity of solar modules and mounting system.

Each contact point of rack and roof needs a mounting hole which damages the membrane and may damage the roof. And each hole needs to be sealed which will increase costs for labor, material and roof insurance.

Professional labor is necessary to assemble the framework, to screw the modules to the framework, and to connect electric wires.

The framework for supporting the modules leads to expensive costs for material and transport.

Japanese patent JP200-71805 discloses a cable structure consisting of cable net which is weaved by longitudinal cables and latitudinal cables. The grid of the cable net provides a space in which a solar module is placed. The four sides of the solar module are respectively supported by the four sides of one grid. And the cable net is placed on a slope provided by a rigid rack. Such cable structure needs many cables, and cables are very expensive: thus, it is very hard to decrease the cost of the cable structure. Except that, the rack is also necessary, and accordingly the rack must be screwed or ballasted on the roof.

SUMMARY OF THE INVENTION

The objective of this invention is to provide a cable support structure to distribute the solar or panels system weight and force loads on the system, on surfaces other than roof to extend solar or panels system installation on roofs with limited static load. Yet another object of the invention is to provide an auto-trigger hook to facilitate the installation of panels or solar modules onto cables or bars or chains or other supports.

The term enclosure in the present disclosure means an area surrounded or divided by fences or walls or other supporting structures. One roof may be an enclosure in itself or may consist of a plurality of enclosures. Moreover, in this invention, the term panel means every type of solar panels or every type of panel used for building construction or covering. The term cable includes things which are relatively long, straight, rigid or soft pieces, like cable or bar or chain.

The cable support of the present invention comprises a cable structure which comprises latitudinal cables. The latitudinal cables extend between two sides of an enclosure of a roof, panels or solar modules are arranged in a row on the latitudinal cables forming an array, the array is supported by the cable structure, and the cable structure in turn is supported by the sides of the enclosure in such a way that weight of the array and force loads on the array being distributed partially or completely on the sides of the enclosure.

The mounting system of solar module array is made by cables, the sides of the enclosure and anchorages. The panels array, supported by the cable structure, distributes force loads on the roof perimeter. The support structure of the invention makes possible array panels installation on roof with static load limitation.

Because the cables are anchored on the opposite sides of the enclosure of a roof, such as walls, and do not depend on the rack, it is not necessary to screw or ballast the roof to anchor the rack, and thus the cost of the installation is further decreased.

Installing the cable structure is faster than assembling the rack and screwing it or ballasting it and sealing the roof holes. Fastening panels on the cables by the automatic-trigger hook or other fastener or hook, is fast. In case cables are also electric cables, electric connection process is reduced drastically.

Because the array of panels is supported by the cable structure, the whole rack material is not necessary. Because the array is not ballasted, ballast material is not necessary. The array of panels or solar modules is primarily supported by the latitudinal cables, and unlike the prior art the cable web with longitudinal cables and latitudinal cables are necessary to unload the weight, so the cost of material for cables will be obviously decreased.

Preferably the latitudinal cables are at different height to tilt the array of panel or solar modules. In this way, unlike the prior art, no additional supports or racks are necessary to tilt array panels. Because rack and ballast are not necessary, the material cost of rack is avoided, the labor cost for assembling the rack is saved, the overload on the roof is avoided and the damage to the roof due to the installation of rack is eliminated.

Preferably one latitudinal cable of the cable structure connects erect pillars which support the upper portion of the panels or solar module to tilt the panels or solar module. This is adaptable to the case that the fitting plane for the tilted panels and solar modules is difficultly defined only by the cables.

Preferably at least one portion of the cable structure is elastic.

Preferably said pillar is elastic.

Preferably at least one portion of the cable supporting the upper portions of the panels or solar modules is elastic.

While existing wind pressure, the elastic portion will be elastically deformed, which decreases the angle between the panels or solar modules and the direction of wind to decrease the wind pressure acting on the panels or solar modules. Because springs or pistons are used to reduce wind load, cables and anchorages can be designed for a lower force load thus cables and anchorages will be cheaper.

Preferably an elastic member is disposed between the panels or solar module and the latitudinal cable which supports the lower portions of the backside of the panel or solar module, and the elastic member is extendable in case the panel or solar module spins upwardly due to wind blowing towards the backside.

In case wind blows towards the backside of the panel or solar module, the elastic member is stretched to enable the panel or solar module to spin upwardly. A panel or solar module spinning upwardly, lets backside wind to flow with little resistance, thus wind load on the array is reduced.

Preferably overloading supporting members are disposed below the cable structure to unload the excess load of rated load of the cable structure.

Preferably the overloading supporting member is a longitudinal cable which is perpendicular to cable structure and extending between the walls on the roof; or the overloading supporting member is an elastic member installed on the roof. The weight of panels or solar modules is mostly borne by the cable structure, and if the load is in excess of the rated load of cable structure, the longitudinal cable will partake the excess weight. The installation of the elastic member installed on the roof needs not to form fitting holes on the roof and just needs some backing to underlay the elastic member.

Preferably the cables are anchored on the sides of the enclosure, or are connected to the sides of the enclosure by clamps clamping the sides or sticks stuck in the wall, or are connected to supporting members installed on the sides of the enclosure, or connected to counterweights fixed on the ground after having been guided by pulleys disposed on the sides of the enclosure.

Preferably the cables are electrical wires. The cables have the capacity of electrifying and load bearing, so the cables are used to transmit electricity generated by solar modules, and therefore the electrical connection during installation of solar power apparatus is simplified.

The present invention also provides a cable support which comprises cable structure consisted of parallel cables which extending between pillars, each of which has perforations at different levels, the cable connecting the pillars by going through the perforations thereof, panels or solar modules being arranged in line on the cable structure and being supported by the cable structure. Or supporting cable can be secured to the pillars by hooks inserted in the pillars perforations.

The auto-trigger hook of the present invention comprises a base, a slot ware disposed on the base and a latch. The slot ware provides a slot and inside the first sidewall of the slot is formed with an installation hole which receives the latch. An elastic member is disposed in the installation hole, presses on the latch, and the latch thus extends from the installation hole toward the second sidewall of the slot, the latch and bottom of the slot defines a space for fixedly interlocking a cable or a bar or a chain, and one side of the latch which faces the opening of the slot is formed with a guiding slope.

The auto-trigger hook of the present invention can be quickly and simply fixed on the cable. In operation, firstly the cable is embedded into the straight slot of the slot ware, while the cable contacts the guiding inclined plane, a pressure force from the cable will push the latch into the installation hole and thus the cable will pass the latch to the deep of the straight slot. Once the cable or bar or chain has gone over the latch, the latch will bounce back, and thus the cable or bar or chain will stay interlocked in the space defined by the latch and the bottom of the straight slot.

Preferably, the slot is straight slot, and pluralities of slot wares are disposed on the base, and the straight slots of the slot wares are located in line.

Preferably, a cavity is formed in the second sidewall in order to receive and support the outer end of the latch ejected from the installation hole of the first sidewall by the elastic member.

Preferably, the base is attached, by connection members, to panels or solar modules.

Preferably, the slot can tightly hold different kinds of adaptors with different internal sizes, the adaptors being used for seizing cables or bars or chains with different sizes to assure a tight fit of cables with different diameters with the slot ware. The width of the straight slot may be designed to the cable diameter to enable the cable and the straight slot to tightly fit with each other. While the diameter of the cable or bar or chain is smaller than the straight slot width, the cable or bar or chain can tightly fit in the auto-trigger hook by the adaptor. Depending on the material the adaptor is made, the adaptor creates friction on the cable so that the cable cannot slide along the slot.

The present invention can be used not only in the solar application but also in other than solar application, and makes feasible the installation of panels on areas that have weight load limitations. Weight load is distributed on the roof perimeter. This opens a new market.

Neither anchor points nor holes are present on the roof area. This implies savings on material, labor and roof insurance.

Panels rack is not necessary. This implies saving on design, labor for assembly, material and transport.

Panels are secured at the cables by simply "clicking-in" the cables to hooks (mounted on the panel back). This implies savings on labor.

The above-mentioned objective, features and advantages of the present invention will be more detailedly described below.

DESCRIPTION OF THE PREFERRED EMBODIMENTS

Figure 1:
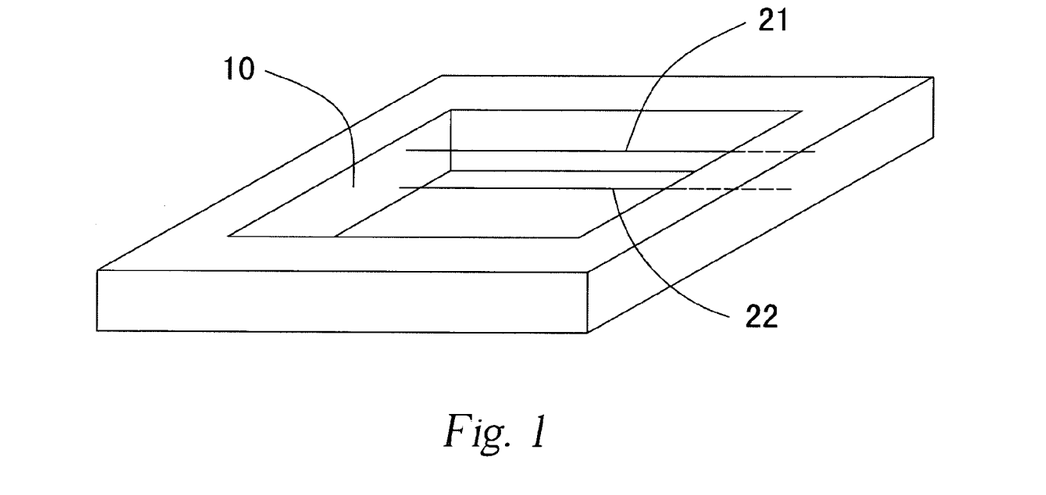
FIG. 1 is the schematic perspective view of a cable support structure in the one embodiment of the present invention.

As shown in FIG. 1, the cable support structure comprises two latitudinal cables 21, 22. The two cables 21, 22 are parallel to each other and extend between two opposite sides 10 of an enclosure on a roof. The plane in which the two cables 21, 22 are located has an angle with the horizontal plane. The side 10 is a wall or an upright structure of masonry, wood, plaster, or other building material serving to enclose, divide, or protect the enclosure. The roof may be the enclosure itself, thus the sides 10 may be the perimeter of the roof.

Figure 2:
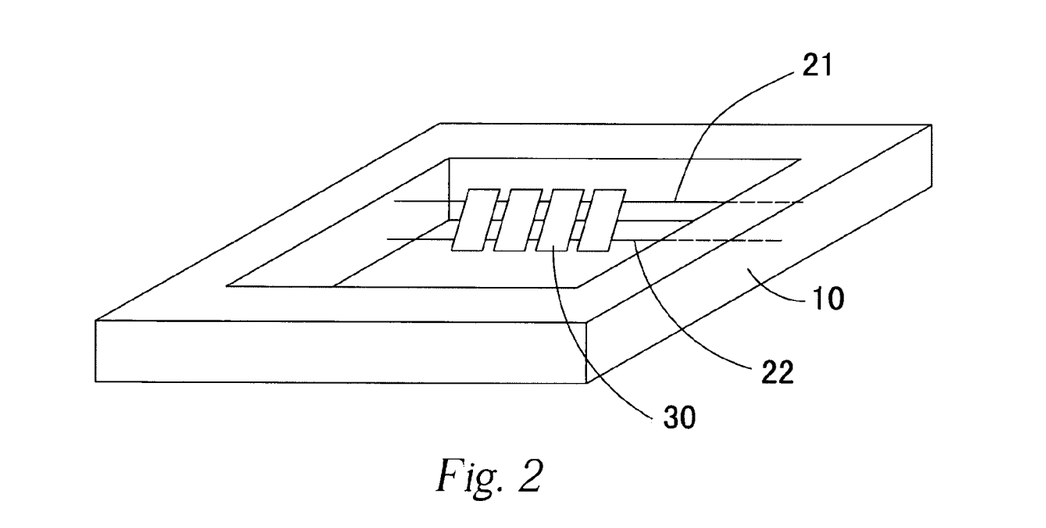
FIG. 2 is the schematic perspective view of the cable support structure illustrated in FIG. 1 on which panels or solar modules are installed.

As shown in FIG. 2, panels or solar modules 30 are installed on the latitudinal cables 21, 22. For example, the panels or solar modules 30 are fixed on the latitudinal cables 21, 22 with the hooks or different fasteners on the back thereof. Because only two substantially parallel latitudinal cables 21, 22 are necessary to support panels or solar modules 30, the material cost is cut down while comparing with cable web, for example, no longitudinal cables (perpendicular to cables 21, 22) are needed. The advantages using only latitudinal cables to support panels or solar modules 30 will be seen in the embodiments mentioned hereinafter.

In the embodiment illustrated in FIG. 1 and FIG. 2, only one array of panels or solar panels 30 is shown. However, pluralities of arrays could be disposed between the two opposite sides of the enclosure in the same way as illustrated in FIG. 1 and FIG. 2, to form a place generating electricity by solar energy on a large scale.

The embodiment shown in FIG. 1 and FIG. 2 has the simple process of installation as follows:
1. Anchoring latitudinal cables 21, 22 on the two opposite sides of the enclosure on a roof;
2. Installing panels or solar modules 30 on the cables 21, 22 by hooks or fasteners;
3. Providing the electrical connection for the installation of solar modules.

Figure 3:
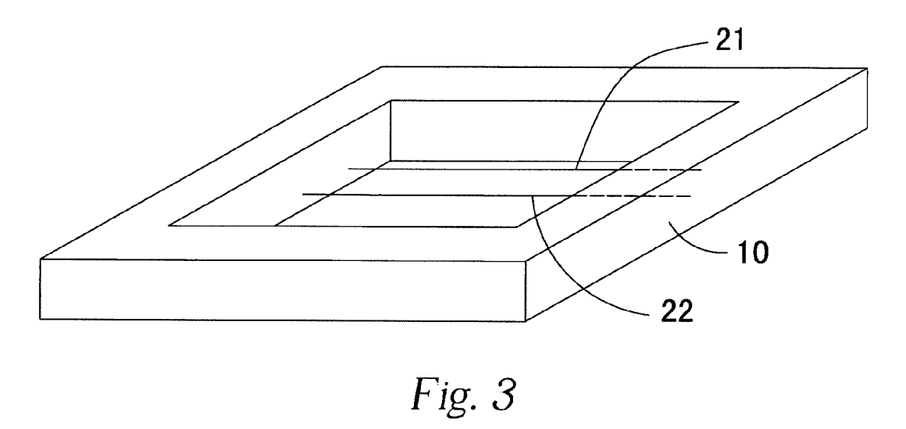
FIG. 3 is the schematic perspective view of parts of a cable support structure in another embodiment of the present invention.
Figure 4:
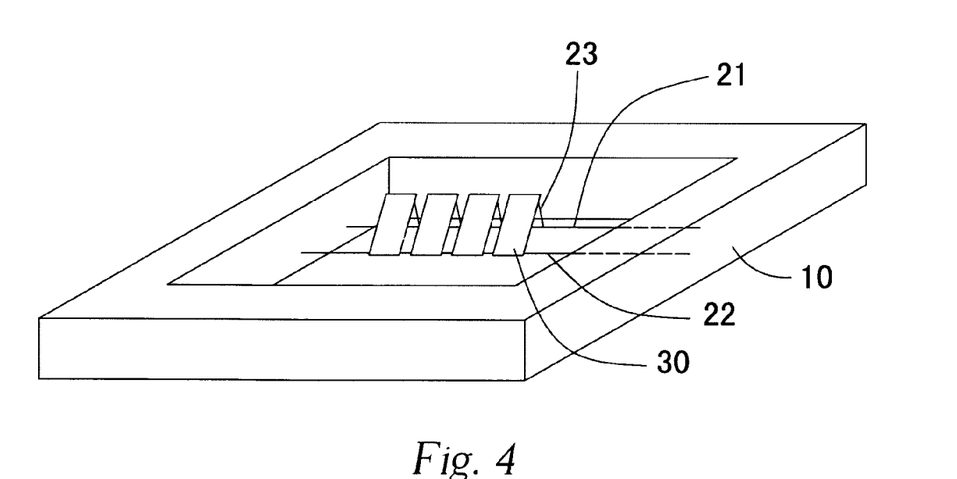
FIG. 4 is the schematic perspective view of the cable support structure illustrated in FIG. 3 on which panels or solar modules are installed.

FIG. 3 and FIG. 4 illustrate the second embodiment of the present invention.

As shown in FIG. 3, two latitudinal cables 21, 22 extend between two opposite sides of the roof perimeter. The plane defined by cables 21, 22 is substantially parallel to the horizontal plane. With reference to FIG. 4, cable 21 connects with pillars 23. The bottom end of pillar 23 connects with cable 21 and the top end of pillar 23 supports the upper portion of panel or solar module 30. Cable 22 directly supports the lower portion of panels or solar modules 30. And panels or solar modules 30 thus are tilted.

Because the plane defined by the two latitudinal cables 21, 22 has an adjustable angle with respect to the horizontal plane, the panels or solar modules 30 are inclined to optimally absorb sunlight. As shown in FIG. 2, the tilt of the panels or solar modules is provided by cables unlike the prior art where the tilted plane is formed on a rigid rack.

As shown in FIG. 1 and FIG. 2, because panels or solar modules 30 are tilted by the two latitudinal cables 21, 22 rack system is not necessary. And thus no installation holes or fewer holes are formed in the roof and this prevents the damage of the roof and saves the manual work for rack installation.

Referring again to FIG. 2, if pluralities of arrays of panels or solar modules 30 are disposed between two opposite sides of the enclosure perimeter, the weight of panels or solar modules 30 is borne by walls or other anchorage systems along the perimeter of enclosure on a roof.

The second embodiment shown in FIG. 3 and FIG. 4 has the same advantages of the first embodiment, and especially adaptable to the case that it is difficult for two cables to define an inclined plane.

The cables shown in FIG. 1 and FIG. 2 not only have the function of bearing load but also have the function of transmitting electricity. Thus, the most of work for the electrical connection has been done by installing the cables 21, 22. However, it should be noted that the material for the cables is, but not limited to, metal or plastic.

Figure 5:
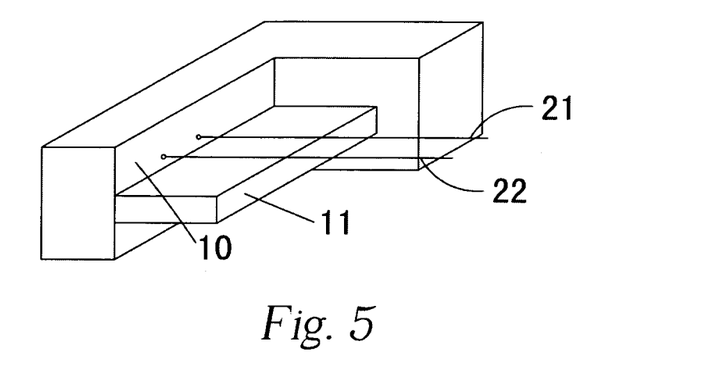
FIG. 5 is the schematic view illustrating the installation structure of the cable structure in another embodiment of the present invention.

In each embodiment of the present invention, many structures can be used to anchor the terminals of cables 21, 22 at the opposite sides of the enclosure on a roof As shown in FIG. 5, the ends of cable 21, 22 are anchored into side 10 of the enclosure on a roof 11. The roof 11 may be an enclosure in itself and the side 10 thus may be a wall on the perimeter of the roof 11.

Figure 6:
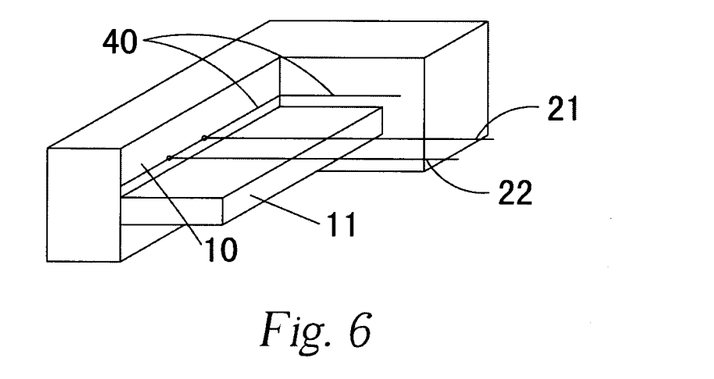
FIG. 6 is the schematic view illustrating the installation structure of the cable structure in another embodiment of the present invention.

As shown in FIG. 6, the supporting member 40 is installed around the sides 10 of the enclosure on a roof 11. The supporting member 40 is but not limited to bars or cables or wires or cords or chains. The ends of cables 21, 22 are connected with the supporting member 40.

Figure 7:
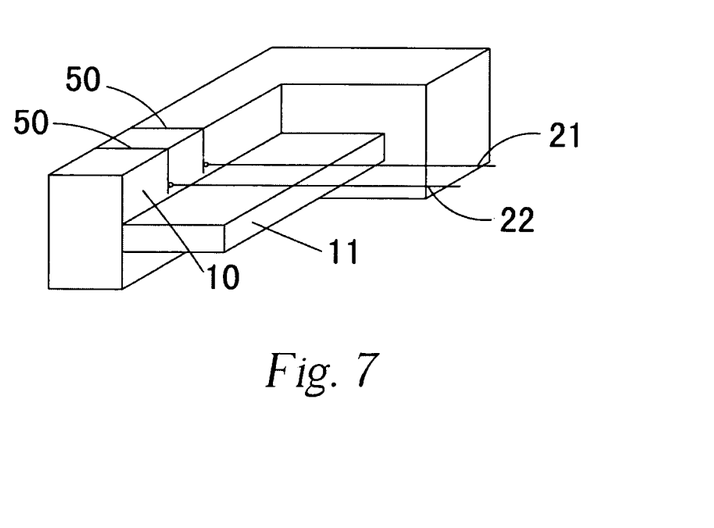
FIG. 7 is the schematic view illustrating the installation structure of the cable structure in another embodiment of the present invention.

As shown in FIG. 7, the ends of cables 21, 22 also can be connected to the clamps 50 which grip side or wall 10 of the enclosure on a roof 11.

Figure 8A:
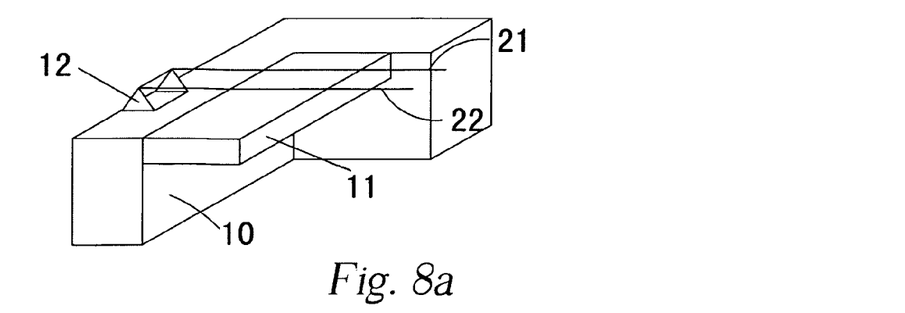
FIG. 8a is the schematic view illustrating the installation structure of the cable structure in another embodiment of the present invention.

In the embodiment illustrated in FIG. 8a where no wall protruding from roof 11, racks or supporting assemblies 12 are disposed on the sides of enclosure on roof, the terminals of the cables 21, 22 are anchored to the racks or supporting assemblies 12.

Figure 8B:
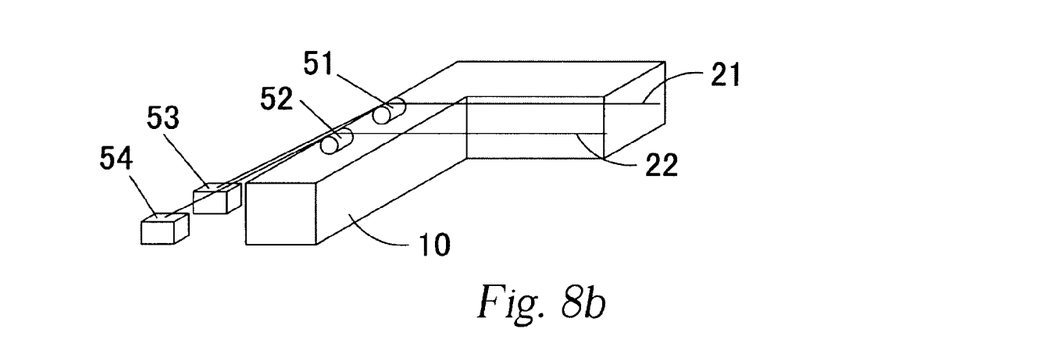
FIG. 8b is the schematic perspective view of the cable support structure in another embodiment of the present invention.

As shown in FIG. 8b, pulleys 51, 52 are fixedly disposed on the opposite sides 10 of an enclosure on a roof, and counterweights 53, 54 are fixedly disposed on the ground. Cable 21 is guided by pulley 51 and then connected to the counterweight 53. Cable 22 is guided by pulley 52 and then connected to the counter weight 54.

Figure 8C:
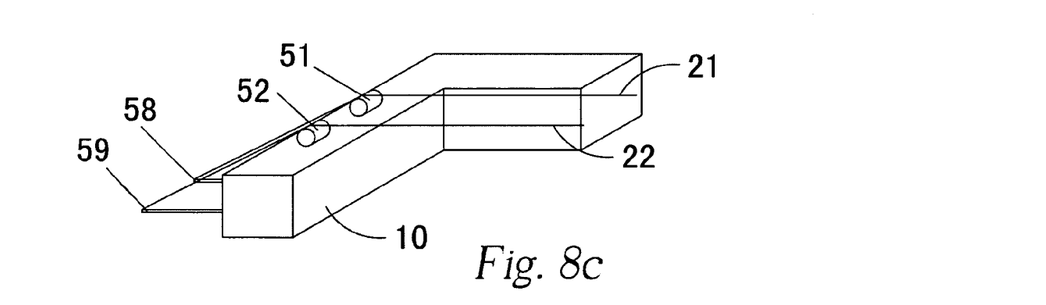
FIG. 8c is the schematic perspective view of the cable support structure in another embodiment of the present invention.

As shown in FIG. 8c, pulleys 51, 52 are fixedly disposed on the opposite sides 10 of an enclosure on a roof. Cable 21, 22 are respectively guided by pulley 51, 52 and then respectively connected to the sticks 58, 59 which are stuck in the wall of the building where the roof is.

For some places where high wind pressure exists, panels or solar modules 30 should better to be movable to adjust their tilt to reduce the load generated by wind. In this way cables 21, 22 and anchorages can be designed for a smaller wind load. To avoid uplift effects of wind blowing to the back of panels, panels can be covered with a flat structure which is properly pitched.

Figure 9:
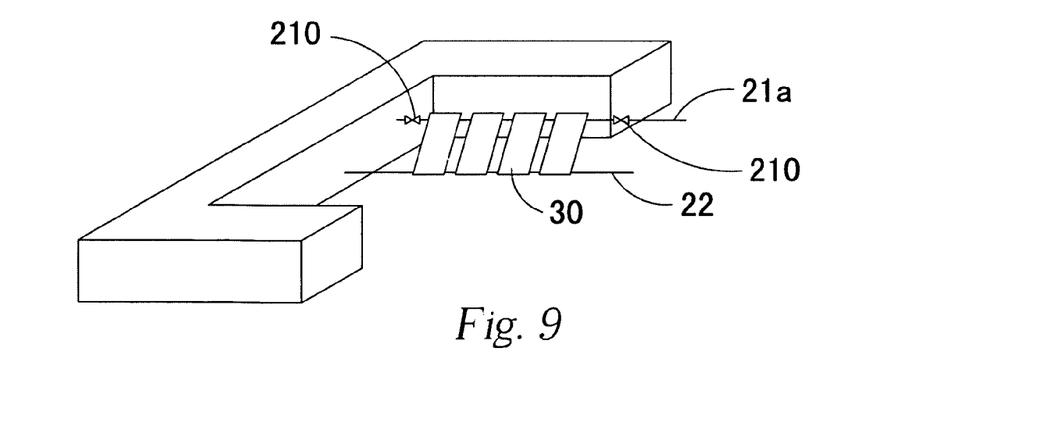
FIG. 9 is the schematic perspective view of the cable support structure in another embodiment of the present invention.

As illustrated in FIG. 9, part or parts of cable 21a at the upper position are elastic element 210 or elements 210. Elastic element 210 is, for example, a spring or a piston. While wind pressure acts on panels or solar modules 30, elastic elements 210 have an elastic deformation, and thus the cable 21a becomes longer, and the inclined angle of panels or solar modules 30 accordingly decreases, which at last will decrease the load generated by wind.

Figures 10, 10A:
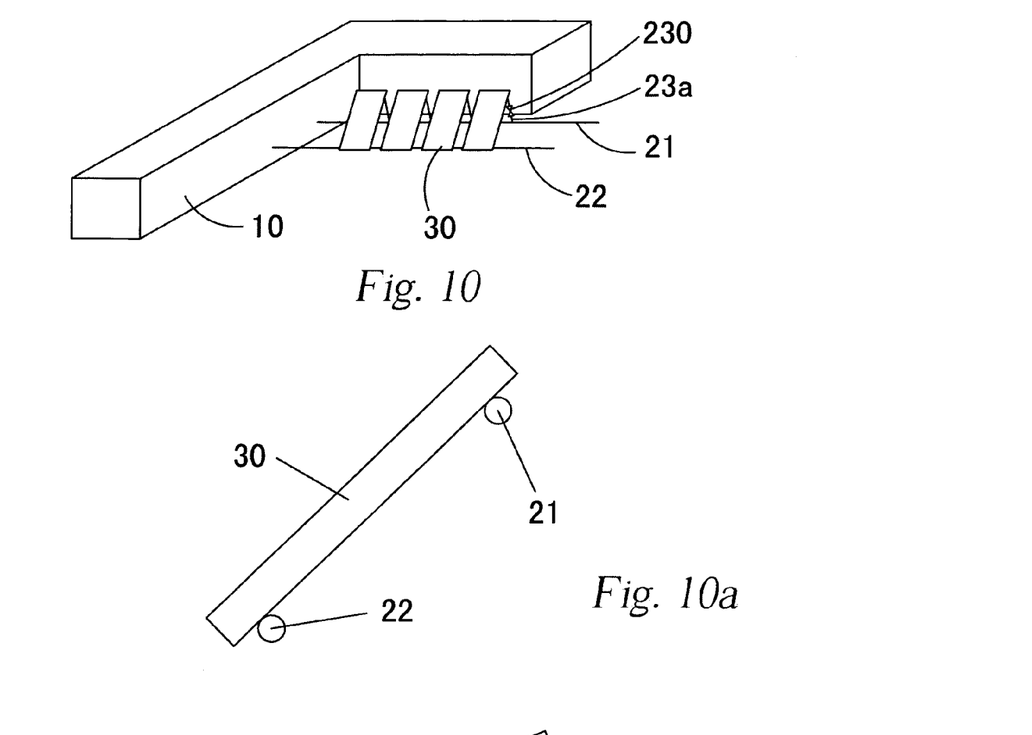
FIG. 10 is the schematic perspective view of the cable support structure in another embodiment of the present invention.
FIG. 10a is the side view of the cable support structure in another embodiment of the present invention.

As FIG. 10 illustrated, pillar 23a has at least one elastic part which is elastic element such as spring or piston 230. The embodiment shown in FIG. 10 has the same advantages of the embodiment in FIG. 9.

Figure 10B:
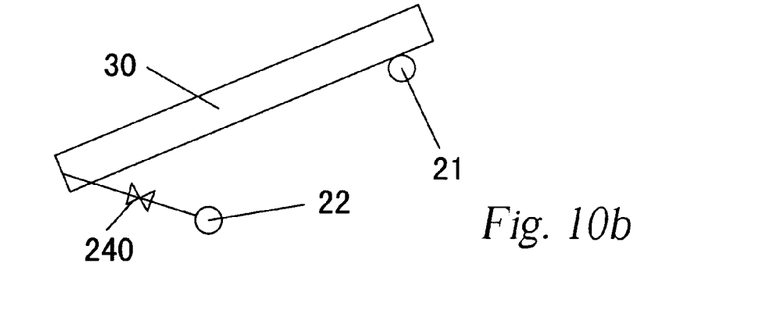
FIGS. 10b and FIG. 10c illustrate the principle of the structure in FIG. 10a reducing wind load caused by the wind from the backside.
Figure 10C:
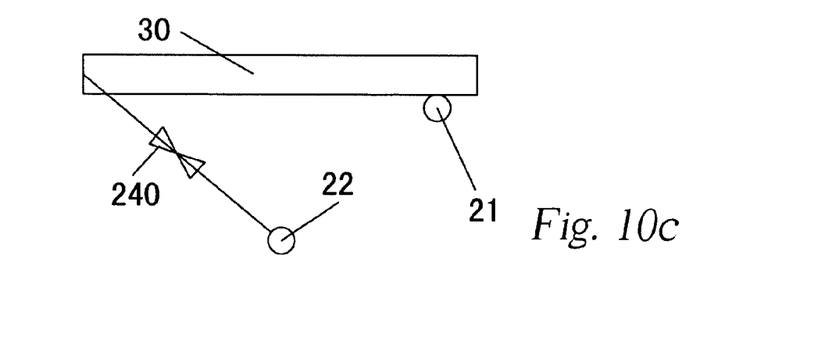

To avoid uplift effects of the whole array because blowing wind on the panels backside, as shown in FIG. 10a, the cable 22 is connected to the lower portion of the back of the panel or solar module 30 with an elastic member 240, for example, a spring or a piston. The elastic member 240 acts as a speed absorber. In case window blows from the back of the panels or solar modules, as shown in FIGS. 10b and 10c, panels or solar modules spin upwardly and let the wind flow. In this way the uplift wind load on backside is reduced.

The structure reducing wind load is applicable to all embodiments of the invention where the panels or solar modules are titled.

In some cases (wind, snow), the force load of array of panels or solar modules 30 on the cables 21, 22 is larger than the rated load of parallel cables. The embodiment illustrated in FIG. 11 is suitable for such cases.

Figure 11:
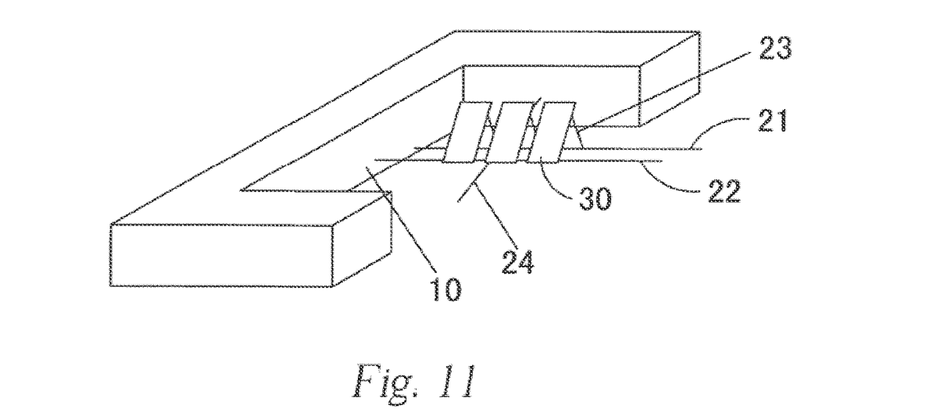
FIG. 11 is the schematic perspective view of the cable support structure in another embodiment of the present invention.

As shown in FIG. 11, one longitudinal cable 24 is disposed below and perpendicular to the latitudinal cables 21, 22. Cable 24 also extends between opposite sides of an enclosure on a roof. Cable 24 may contact cables 21, 22. While the force load of panels or solar modules 30 on the cables 21, 22 is larger than the rated load of the cables 21, 22, the longitudinal cable 24 will share or partake the excessive load.

Figure 12:
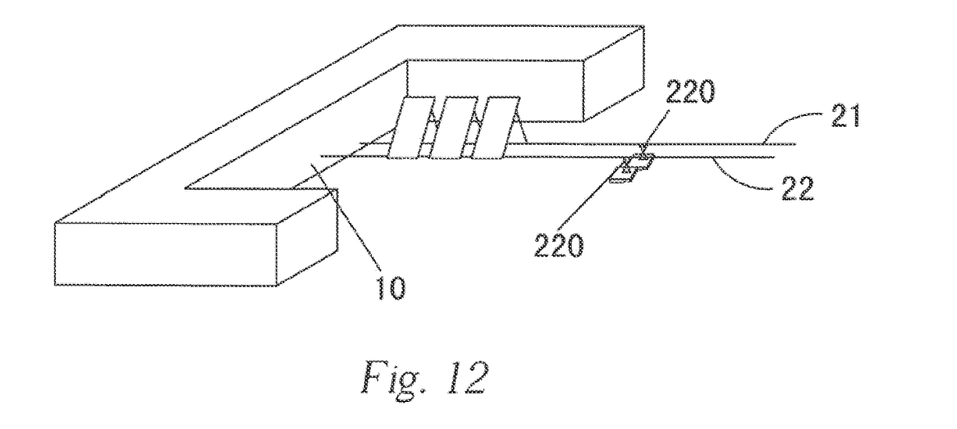
FIG. 12 is the schematic perspective view of the cable support structure in another embodiment of the present invention.

The embodiment illustrated in FIG. 12 is also usable to partake excessive load. Elastic supporting members 220, such as springs or pistons, are disposed below the cables 21, 22. The overload on the cables 21, 22 will be borne by the elastic supporting members 220.

In both of embodiments shown in FIG. 11 and FIG. 12, the latitudinal cables 21, 22 are the primary supporting members while the longitudinal cables 24 or the elastic supporting members 220 are secondary supporting members for the panels or solar modules. However the panels or solar modules are always connected on the latitudinal cables, and the longitudinal cable or cables is or are substantially used for anchorage or support for the array.

Figure 13:
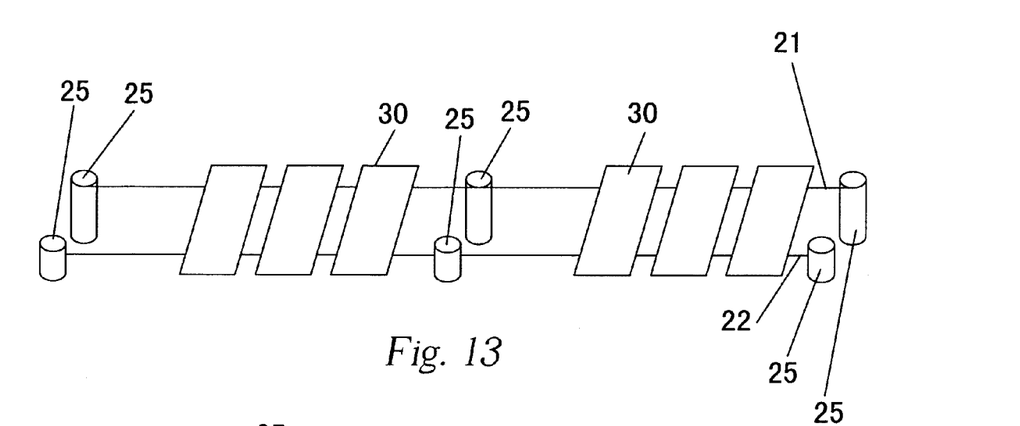
FIG. 13 is the schematic perspective view of the cable support structure in another embodiment of the present invention.
Figure 14:
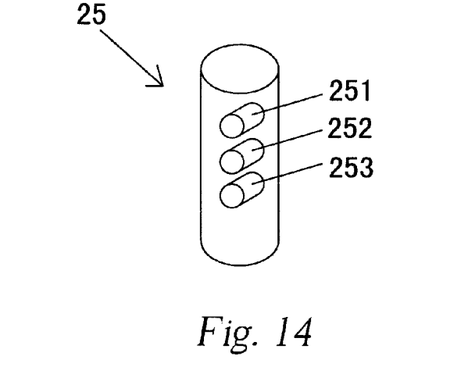
FIG. 14 is the schematic perspective view of the pillar in another embodiment of the present invention.

The embodiment illustrated in FIG. 13 and FIG. 14 is the cable support structure for installing the panels or solar modules on the ground. The cable support structure comprises pluralities of pillars 25 fixed on the ground. Each pillar has pluralities of perforations 251, 252, 253 at different levels. Cables 21, 22 connect the pillars 25 by extending through their perforations at the desired height. Cables 21, 22 can be also secured to the pillar by hooks inserted in the pillar perforations at different heights. Cables, pillars and eventually hooks, constitute the support structure and substitute the traditional rack system.

In each embodiment of the present invention, many kinds of hooks or fasteners could be selected to fix the panels or solar modules 30 to the cables 21, 22. However, the auto-trigger hook illustrated in FIG. 15 to FIG. 21 may be the best choice to fix the panels or solar modules 30 to the cables 21, 22. The auto-trigger hook has the advantage of quick and simple operation.

Figure 15:
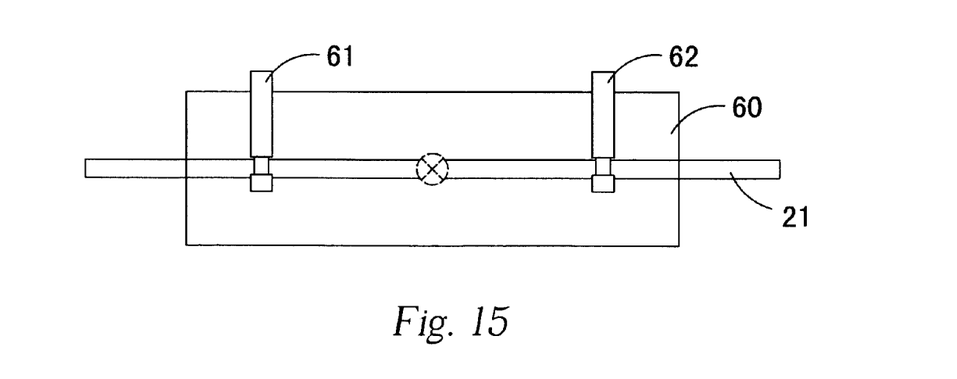
FIG. 15 is the schematic front view of the auto-trigger hook in another embodiment of the present invention.
Figure 16:
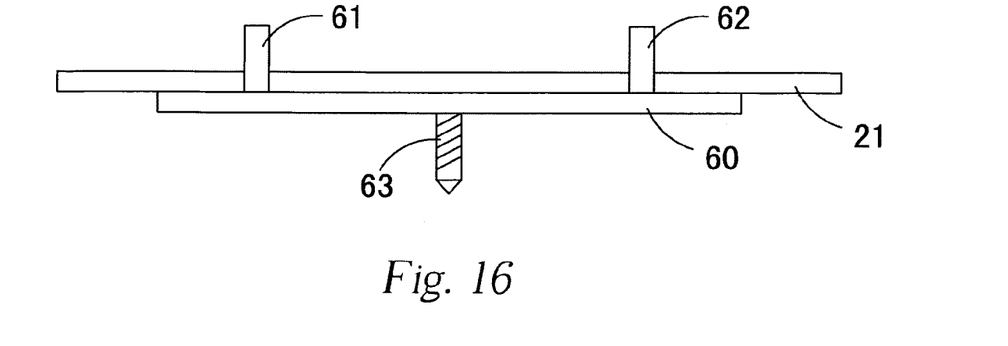
FIG. 16 is the top view of the auto-trigger hook of the present invention.
Figure 17:
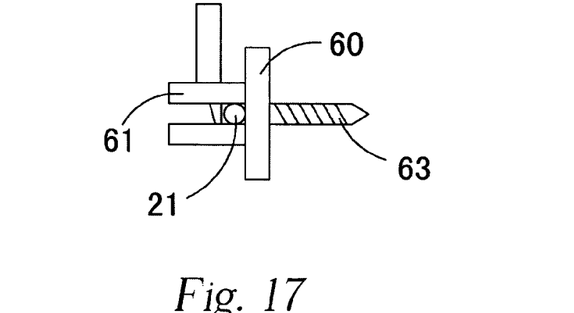
FIG. 17 is the cross-sectional view along the line A-A in FIG. 15.
Figure 18:
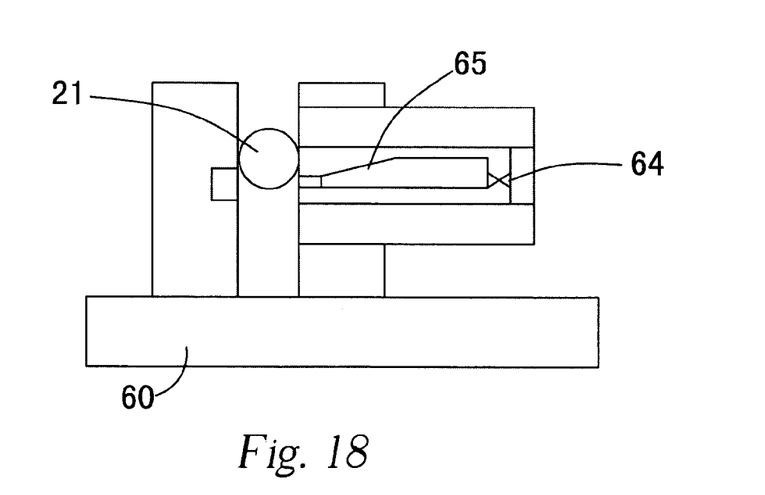
FIG. 18 illustrates the process of interlocking of the auto-trigger hook and a cable or a bar or a chain.
Figure 19:
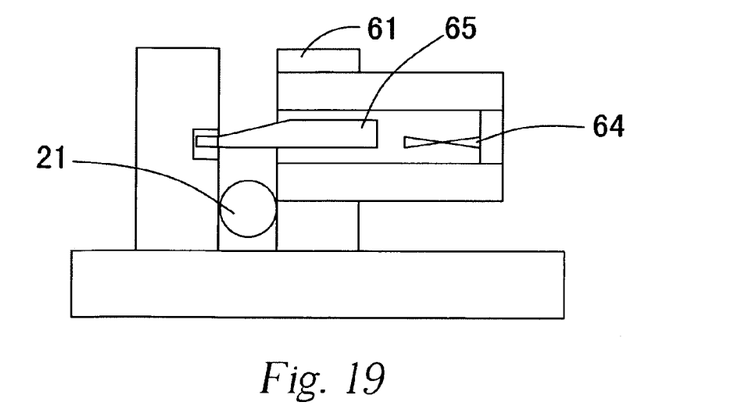
FIG. 19 is the schematic view of the auto-trigger hook which has already been fixedly connected with the cable or the bar or the chain.
Figure 20:
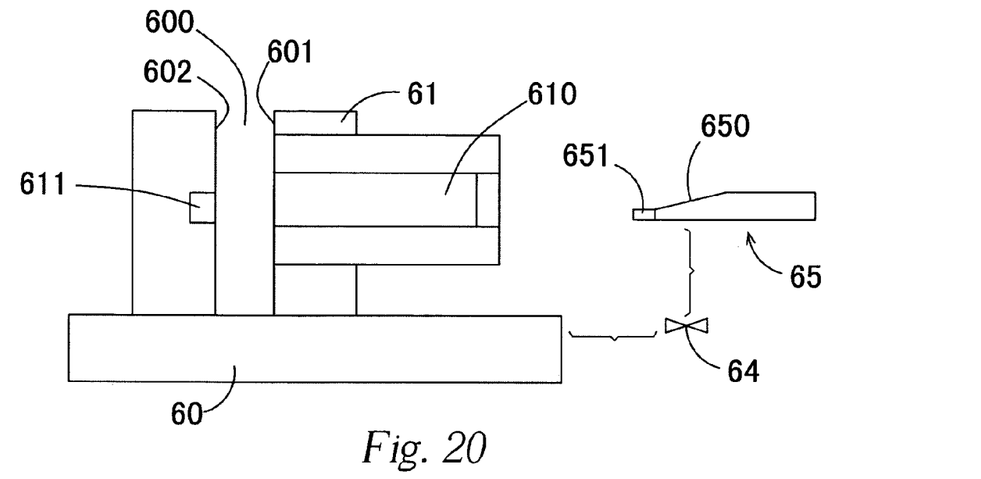
FIG. 20 is the exploded view of the auto-trigger hook.
Figure 21:
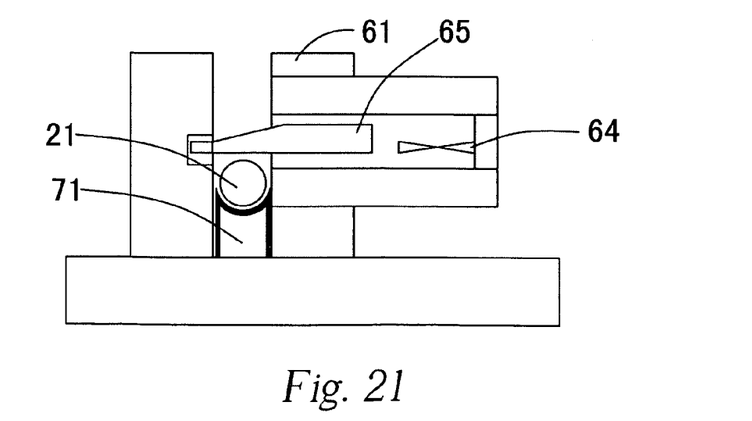
FIG. 21 is the schematic view of the auto-trigger hook disposed with an adaptor.

As shown in FIG. 15 to FIG. 17, FIG. 20 and FIG. 21, the auto-trigger hook comprises a base 60 on which slot wares 61, 62 are installed. Slot wares 61, 62 provide straight slots 600. As shown in FIG. 15, at least two slot wares 61, 62 are separately disposed on the base 60. Straight slots 600 of slot wares 61, 62 are located in line. The first sidewall 601 of straight slot 600 of each slot ware 61, 62 provides an installation hole 610 in which a latch 65 is disposed. Elastic member 64 is disposed in the installation hole 610. The latch 65 in the installation hole 610 is pressed by the elastic member 64 and the latch 65 thus extends from the installation hole 610 to the second sidewall 602, preferably the outer end 651 of the latch 65 extends into the hole 611 of the second sidewall 602. The latch 65 and the bottom of the straight slot define a space for receiving and fixing cable 21 or 22. Hole 611 is designed to give a supporting point to latch 65 when cable 21 or 22 pushes to go out. Guiding slope 650 is formed on the side of latch 65 facing the opening of the straight slot. Screws 63 are disposed on base 60. By means of screws 63, the whole of auto-trigger hook could be fixed on a panel or solar module 30 or any other object. As shown in FIG. 18, when beginning to fix panel or solar module 30 to the cable 21 or 22, firstly the cable 21 is aligned with straight slots of slot wares 61, 62, then the cable is pressed into the straight slot 600: the cable will firstly contact the guiding slope 650 of latch 65, and then the cable 21 will press the latch 65 into the installation hole 610 of the first sidewall 601 of the straight slot 600, and cable 21 will pass the latch and last arrive at the bottom of straight slot. As shown in FIG. 19, once the cable 21 has passed the latch 65, the latch 65 is ejected by the spring or elastic member 64. While cable 21 has the trend to slip out of the straight slot 600 due to the external force such as wind pressure, the latch 65 will stop such trend: thus, the auto-trigger hook can fasten the panel or solar module with the cable. In order to achieve a tight fit, the width of straight slot 600 cable could be designed to be as wide as cable 21 (or 22) diameter. As shown in FIG. 21, a cable adaptor 71 can be put in the straight slot so that cables with diameter smaller than the straight slot width can tightly fit in the auto-trigger hook. Depending on the material the adaptor is made, the adaptor creates friction on the cable so the cable cannot slide along the straight slot.

While certain illustrative embodiments have been described, it is evident that many alternatives, modifications, permutations and variations will become apparent to those skilled in the art in light of the foregoing description. For example, the latitudinal cables are not always parallel cables, in some cases the may not parallel, and anchorages on the middle of the enclosure may be added.

What is claimed is:

1. A cable support structure comprising a cable structure which comprises latitudinal cables extending between two sides of an enclosure of a roof, panels or solar modules being arranged in a row on the latitudinal cables forming an array, the array being supported and anchored by the cable structure, the cable structure in turn being supported by sides of the enclosure in such a way that weight of the array and force loads on the array are completely or partially distributed on the sides of the enclosure, said cable structure having only latitudinal cables extending between the two sides of the enclosure.

2. A cable support structure comprising a cable structure which comprises latitudinal cables extending between two sides of an enclosure of a roof, panels or solar modules being arranged in a row on the latitudinal cables forming an array, the array being supported and anchored by the cable structure, the cable structure in turn being supported by sides of the enclosure in such a way that weight of the array and force loads on the array are completely or partially distributed on the sides of the enclosure, the latitudinal cables being at different heights to tilt the array of panel or solar modules.

3. The cable support structure according to claim 2, wherein the cable support structure also comprises overloading supporting members which are disposed below the cable structure to unload the excessive load.

4. A cable support structure comprising a cable structure which comprises latitudinal cables extending between two sides of an enclosure of a roof, panels or solar modules being arranged in a row on the latitudinal cables forming an array, the array being supported and anchored by the cable structure, the cable structure in turn being supported by sides of the enclosure in such a way that weight of the array and force loads on the array are completely or partially distributed on the sides of the enclosure, one latitudinal cable of the cable structure connecting erect pillars which support an upper portion of the panels or solar modules to tilt the panels or solar modules.

5. The cable support structure according to claim 4, wherein at least one portion of the pillar is an elastic member.

6. A cable support structure comprising a cable structure which comprises latitudinal cables extending between two sides of an enclosure of a roof, panels or solar modules being arranged in a row on the latitudinal cables forming an array, the array being supported and anchored by the cable structure, the cable structure in turn being supported by sides of the enclosure in such a way that weight of the array and force loads on the array are completely or partially distributed on the sides of the enclosure, at least one portion of the latitudinal cable being an elastic member.

7. A cable support structure comprising a cable structure which comprises latitudinal cables extending between two sides of an enclosure of a roof, panels or solar modules being arranged in a row on the latitudinal cables forming an array, the array being supported and anchored by the cable structure, the cable structure in turn being supported by sides of the enclosure in such a way that weight of the array and force loads on the array are completely or partially distributed on the sides of the enclosure, at least one portion of the latitudinal cable which supports an upper portion of the panels or solar modules being an elastic member.

8. A cable support structure comprising a cable structure which comprises latitudinal cables extending between two sides of an enclosure of a roof, panels or solar modules being arranged in a row on the latitudinal cables forming an array, the array being supported and anchored by the cable structure, the cable structure in turn being supported by sides of the enclosure in such a way that weight of the array and force loads on the array are completely or partially distributed on the sides of the enclosure, an elastic member being disposed between the panels or solar modules and the latitudinal cable which supports lower portions of the backside of the panel or solar module, and the elastic member is extendable in case the panel or solar module spins upwardly due to wind blowing towards the backside.

9. The cable support structure according to claim 8, wherein the overloading supporting member is a longitudinal cable which is perpendicular to latitudinal cable and extending between sides of the enclosure, and the longitudinal cable is also fastened to latitudinal cables to avoid array uplift moves.

10. The cable support structure according to claim 9, wherein the cables are anchored on the sides of the enclosure, or are connected to the sides of the enclosure by clamps clamping the sides or sticks stuck in a wall, or are connected to supporting members installed on the sides of the enclosure, or connected to counterweights fixed on the ground after having been guided by pulleys disposed on the sides of the enclosure.

11. A cable support structure comprising a cable structure which comprises latitudinal cables extending between two sides of an enclosure of a roof, panels or solar modules being arranged in a row on the latitudinal cables forming an array, the array being supported and anchored by the cable structure, the cable structure in turn being supported by sides of the enclosure in such a way that weight of the array and force loads on the array are completely or partially distributed on the sides of the enclosure, the cables being electrical wires.

12. A cable support structure comprising a cable structure which comprises latitudinal cables extending between two sides of an enclosure of a roof, panels or solar modules being arranged in a row on the latitudinal cables forming an array, the array being supported and anchored by the cable structure, the cable structure in turn being supported by sides of the enclosure in such a way that weight of the array and force loads on the array are completely or partially distributed on the sides of the enclosure, the side of the enclosure being replaced with pillars on the ground, each of pillars having perforations at different levels, the cable connecting the pillars by extending through the perforations thereof.

* * * * *